April 25, 1933.  W. DE BACK  1,906,049

CLEAN-OUT MECHANISM

Filed March 30, 1931

INVENTOR.
William de Back.
BY
Philip A. Minnis
ATTORNEY.

Patented Apr. 25, 1933

1,906,049

UNITED STATES PATENT OFFICE

WILLIAM DE BACK, OF SAN JOSE, CALIFORNIA, ASSIGNOR TO FOOD MACHINERY CORPORATION, OF SAN JOSE, CALIFORNIA, A CORPORATION OF DELAWARE

CLEAN-OUT MECHANISM

Application filed March 30, 1931. Serial No. 526,253.

This invention relates to certain new and useful improvements in fruit treating apparatus of the general character disclosed in copending applications filed by Lloyd E. Jones, Serial No. 367,667, filed June 1, 1929, and Serial No. 607,577, filed April 26, 1932, such as used in the fruit packing industry to clean, dry or polish fruit, and has particular reference to a simplified structure for cleaning out the fruit remaining in the apparatus at the end of its run. In the operation of apparatus of the character referred to the fruit, while being subjected to treatment, is supported upon and advanced by a series of substantially cylindrical supporting members mounted upon fixed axes and arranged in parallel relation, so as to form article holding grooves therebetween, all the members being adapted for rotation in a common direction. The supporting members may be provided with bristles for brushing the fruit as it is advanced thereover, or with absorbent means for drying the fruit, or they may be just plain surfaced rollers.

In the operation of such machines, as is well known, the fruit tends to collect in the grooves between the rotating supporting members, where it remains without advancing so long as no additional fruit is fed to the apparatus. Upon additional fruit being fed to the machine, those pieces in the grooves are caused to advance over the tops of the rotating supporting members, due to friction therewith, augmented by the urge of oncoming fruit behind. In this manner the fruit is advanced through the machine so long as additional fruit continues to be fed thereto. When fruit ceases to be fed, however, the advance also ceases and the fruit in the grooves remains there, since the friction with the supporting members is not in itself sufficient to cause movement of the fruit.

In running successive lots of fruit through such machines it is necessary to keep them separate from each other in order to prevent intermingling of the different lots and thus confusing different kinds of fruits or mixing the fruit belonging to one grower with that belonging to another, and to do this it is necessary that each lot be run separately. As pointed out above, however, after the feeding of one lot is completed the advance of the fruit stops, so that a certain amount remains in the machine and must be cleaned out before the next lot is fed, in order to prevent mixing.

Heretofore it has been necessary either to clean out the machine by hand, or to provide special mechanism for the purpose. When the machine is cleaned out manually, the operation is extremely laborious and consumes a large amount of time, especially where the supporting members are encased in a housing, as in washing apparatus or drying machines, and, furthermore, as may readily be seen in cases where large numbers of small lots of fruit are being treated, the time lost by delay due to the cleaning out operations necessary after each lot is run reaches a considerable amount. In cases where special mechanisms are provided for the purpose, the expense of the apparatus is not only greatly increased, but the mechanism occupies a large amount of space and requires more or less attention for maintenance.

It is an object of my invention to provide a clean-out means of such simple nature as to require no operating mechanism whatever, and which will rapidly and efficiently clean out all of the fruit from a machine of the type described without manual assistance.

It is a further object to provide a clean-out mechanism for fruit treating machines of the character described which shall have no moving parts and which may readily be inserted in the machine desired to be cleaned out, accomplishing its purpose simply by continued operation of the machine to which it is applied.

For the purpose of this disclosure I have shown my invention as applied to a brushing machine, and it will be seen that it includes in combination with such machine a clean-out member comprising an upstanding pusher wall or sweep of substantially the same width as the brushes and provided with friction strips which not only support the sweep upon the tops of the brushes, but also cooperate with a pair of side rails provided along the ends of the brushes for guiding it.

When it is desired to clear the apparatus of fruit resting on the brushes it is simply necessary to place the clean-out member upon the rotating brushes at the inlet end and the frictional contact between the friction strips and the brushes causes the clean-out member to advance over the tops of the brushes, sweeping out the fruit ahead of it. The clean-out member is then discharged from the outlet of the machine after the fruit. In this manner the fruit is quickly and easily cleared out in a very simple manner without the necessity of providing the apparatus with complicated and expensive machinery for this purpose.

For a better understanding of my invention reference may be had to the accompanying drawing, in which like reference characters refer to like parts throughout the several views.

Figure 1:
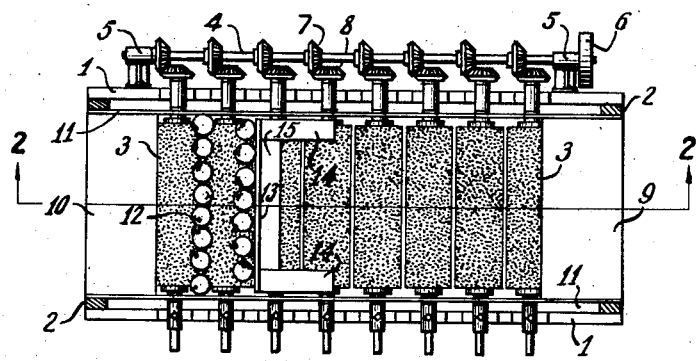
Figure 1 is a plan view of a brushing machine illustrating my invention applied thereto.

Referring to Figure 1, the apparatus illustrated comprises a suitable frame 1, provided with supporting legs 2, and carrying a plurality of transversely disposed rotatable brushes 3, all adapted for rotation in the same direction, so that the fruit advances thereacross transversely to their axes.

The driving means for the brushes comprises a drive shaft 4 located to one side of the apparatus and mounted to rotate in bearings 5 secured to the frame 1. Power may be supplied to a suitable pulley 6 keyed to one end of the drive shaft. A plurality of bevel gears 7 are also keyed to the drive shaft and are adapted to mesh with corresponding gears 8 fixed to the outer ends of the axles upon which the brushes are carried. By this construction, when power is applied to the pulley 6, so that the brushes are caused to operate in the direction of the arrows, fruit to be treated may be fed onto the brushes over a suitable ramp 9, and as long as additional fruit continues to be fed it will be advanced transversely across the brushes and finally discharged therefrom over the discharge ramp 10. A pair of guide walls 11 are mounted adjacent the outer ends of the brushes and serve to keep the fruit on the brushes, as well as to guide the clean-out element shortly to be described.

In the operation of the machine thus far described, when pieces of fruit 12 are fed onto the brushes over the ramp 9 they collect in the groove between the first two brushes until the groove is full, whereupon, when any additional pieces are fed their weight against the fruit in the groove operates to advance those pieces with which they contact, which are, thereupon, advanced over the top of the adjacent brush into the next groove, the newly fed pieces taking their places. It has been found that this action takes place only when the groove is full, due to the fact that the pieces in the groove tend to move sideways when contacted from behind to make room for oncoming fruit. As soon, however, as the groove is full the pieces can no longer move sideways and are, therefore, advanced forwardly over the brushes when additional pieces are fed. In this manner, as long as fruit is fed it is continually advanced over the brushes. When the supply is stopped, however, the advance stops, so that the fruit in the grooves remains there regardless of the rotation of the brushes.

Figure 3:
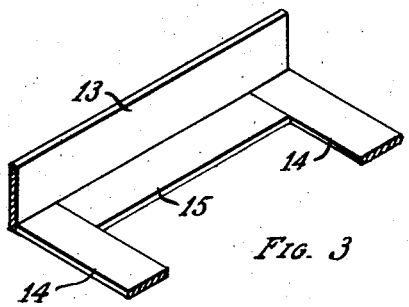
Figure 3 is a perspective view of the clean-out element.

In order to provide for the easy cleaning out of this residual fruit, I have provided the clean-out element illustrated in Figure 3, comprising the upstanding pusher wall or sweep 13, adapted to be supported on the tops of the brushes 3 by the friction strips 14. These strips also cooperate with the side walls 11 and serve as guides for the clean-out element.

I have found that the speed at which the clean-out element moves through the machine depends to a large extent on the area of the element in contact with the brushes, and it will be seen that this may be regulated by varying the width of the friction strips, or by inserting cross strips therebetween, such as indicated at 15. Several of these may be added, if desired, or they may be dispensed with entirely. The amount of frictional area in contact with the brushes may thus be varied to suit requirements.

Figure 2:
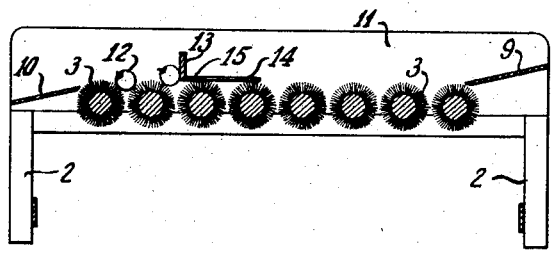
Figure 2 is a sectional view, taken along the line 2—2 of Figure 1.

In operation, when a lot of fruit has been fed to the machine and it is desired to clean out that fruit remaining therein, it is simply necessary to insert the clean-out element in the machine so that it rests upon the tops of the brushes and extends transversely between the sidewalls 11, as shown in Figures 1 and 2, and the frictional contact between the friction strips and the brushes will cause it to be advanced across the tops of the brushes, the sweep 13 pushing the fruit ahead of it. The sweep 13 may be made high enough so that the fruit will not jump over it and in this manner the clean-out element will pass entirely through the machine and be discharged at the outlet end after having cleared out all of the fruit in the machine. This operation requires only a moment and, as pointed out above, the time required may be varied by regulating the area of the friction strips or adding other strips so as to increase the speed of the clean-out element.

Although I have described my invention as being applied to a fruit brushing machine, it will be apparent that its use is not confined thereto but that it is also applicable to other types of machines having other types of supporting means. For example, the apparatus may be used in connection with mechanism for washing or drying the fruit as it passes over the supporting elements, and the supporting elements may be covered with other materials than bristles, or they may be simply plain surfaced. It will also be understood that various changes and modifications may be made in the details or the apparatus shown without departing from the spirit of my invention, and I deem myself entitled to all such modifications and variations as fall within the scope of the claims appended hereto.

Having now described my invention and in what manner the same may be used, what I claim as new and desire to protect by Letters Patent is as follows:

1. In a fruit treating apparatus a plurality of rotatable supporting members forming a fruit supporting runway, means for rotating all of said members in the same direction, a clean out means supported upon said members for advancement thereover by frictional contact therewith.

2. In a fruit treating apparatus including a series of rotatable supporting members mounted in parallel relation to form a fruit supporting runway, and means for rotating all of said members in the same direction, a clean out means freely resting upon a plurality of said members for advancement thereover upon rotation of said members by frictional contact therewith.

3. In a fruit treating apparatus including a series of rotatable supporting members mounted in side by side parallel relation for rotation in the same direction, a clean out means supported by a plurality of said members for advancement across their upper surfaces by frictional contact therewith, and guide means for said clean out means.

4. In a fruit treating apparatus, a fruit supporting runway including a series of rotatable supporting members mounted for rotation in a common direction, a clean out means extending substantially the entire width of the runway and resting upon a plurality of said supporting members so as to be advanced across their upper surfaces upon rotation thereof due to frictional contact therewith.

5. In a fruit treating apparatus, a fruit supporting runway including a series of rotatable supporting members mounted for rotation in a common direction, a clean out element extending substantially the entire width of the runway and resting upon a plurality of said supporting members so as to be advanced across their upper surfaces upon rotation thereof due to frictional contact therewith, guide means for the clean out element, and means on the clean out element for cooperating with said guide means to prevent jamming of said clean out element.

6. In a fruit treating apparatus, a fruit supporting runway including a series of transversely disposed rotatable supporting members mounted for rotation in a common direction, a pair of spaced side rails defining the lateral limits of the runway, and a clean out element comprising a sweep and a pair of spaced friction strips carried by the sweep for cooperation with the side rails to guide the clean out element, each of said friction strips being of sufficient length to rest upon a plurality of the supporting members so as to be advanced across their upper surfaces upon rotation thereof due to frictional contact therewith.

7. In a fruit treating apparatus a fruit supporting runway composed of a plurality of rotatable supporting members arranged in side by side parallel relation, means for rotating said supporting members in a common direction, and a clean out element for placement upon the supporting elements, said clean out element having a substantially flat bottom of sufficient area to extend across a plurality of the supporting members whereby upon rotation thereof it may be advanced across said members by frictional contact therewith.

Signed at San Jose, California, this 20th day of March, A. D. 1931.

WILLIAM DE BACK.